US010435153B2

(12) United States Patent
Klein

(10) Patent No.: US 10,435,153 B2
(45) Date of Patent: Oct. 8, 2019

(54) NETS AND DEVICES FOR FACILITATING CAPTURE OF UNMANNED AERIAL VEHICLES

(71) Applicant: Sanmina Corporation, San Jose, CA (US)

(72) Inventor: Max Edward Klein, Huntsville, AL (US)

(73) Assignee: SANMINA CORPORATION, San Jose, CA (US)

( * ) Notice: Subject to any disclaimer, the term of this patent is extended or adjusted under 35 U.S.C. 154(b) by 0 days.

(21) Appl. No.: 15/841,199

(22) Filed: Dec. 13, 2017

(65) Prior Publication Data

US 2018/0162529 A1    Jun. 14, 2018

Related U.S. Application Data

(60) Provisional application No. 62/434,329, filed on Dec. 14, 2016.

(51) Int. Cl.
*B64C 39/00* (2006.01)
*B64C 39/02* (2006.01)
(Continued)

(52) U.S. Cl.
CPC .............. *B64C 39/024* (2013.01); *B64D 1/02* (2013.01); *F41B 11/80* (2013.01); *F41H 11/02* (2013.01);
(Continued)

(58) Field of Classification Search
CPC . F41H 11/02; F41H 13/0006; B64C 2201/182
See application file for complete search history.

(56) References Cited

U.S. PATENT DOCUMENTS 4,912,869 A * 4/1990 Govett ...................... F41C 7/00
42/105
6,904,838 B1 * 6/2005 Dindl ................. B64D 45/0015
102/400
(Continued)

FOREIGN PATENT DOCUMENTS

RU    2490584 C1    8/2013
RU    2565863 C2    10/2015

OTHER PUBLICATIONS

PCT/US2017/066538. International Search Report & Written Opinion (dated Apr. 26, 2018).

*Primary Examiner* — Brian M O'Hara
*Assistant Examiner* — Michael B. Kreiner
(74) *Attorney, Agent, or Firm* — Loza & Loza, LLP; Julio M. Loza; Tyler J. Barrett

(57) ABSTRACT

Unmanned aerial vehicle (UAV) capture nets, netting systems, UAVs, and methods of making netting systems are disclosed. A UAV capture net may include an open-mesh material, and a plurality of streamers coupled to the open-mesh material, where each of the plurality of streamers includes a free longitudinal end. Netting systems may include a container, a propellant disposed within the container, and a net disposed with in the container, where the net includes an open-mesh structure and a plurality of streamers coupled to the open-mesh structure. UAVs may include an airframe coupled with a propulsion system and a netting system. Methods of making netting systems may include disposing a propellant and a net into a container, where the net includes an open-meshed fabric and a plurality of streamers connected to a portion of the open-mesh fabric. Other aspects, embodiments, and features are also included.

20 Claims, 4 Drawing Sheets

(51) Int. Cl.
  *F41B 11/80*  (2013.01)
  *F41H 11/02*  (2006.01)
  *F41H 13/00*  (2006.01)
  *G05D 1/00*   (2006.01)
  *B64D 1/02*   (2006.01)
  *F41H 11/04*  (2006.01)
  *B64D 3/00*   (2006.01)

(52) U.S. Cl.
  CPC ......... *F41H 11/04* (2013.01); *F41H 13/0006* (2013.01); *G05D 1/0094* (2013.01); *B64C 2201/027* (2013.01); *B64C 2201/108* (2013.01); *B64C 2201/12* (2013.01); *B64C 2201/141* (2013.01); *B64C 2201/146* (2013.01); *B64C 2201/182* (2013.01); *B64D 3/00* (2013.01)

(56) References Cited

U.S. PATENT DOCUMENTS

| | | | | |
|---|---|---|---|---|
| 8,256,336 B2* | 9/2012 | Larkin | ................... | B63G 8/001 |
| | | | | 114/316 |
| 8,375,837 B2* | 2/2013 | Goossen | ............. | F41H 13/0006 |
| | | | | 244/110 F |
| 8,596,178 B2* | 12/2013 | Rogers | ................ | F41H 13/0006 |
| | | | | 102/502 |
| 9,074,858 B2* | 7/2015 | Yee | ......................... | F41H 11/02 |
| 9,085,362 B1* | 7/2015 | Kilian | ...................... | B64F 1/02 |
| 9,134,099 B2* | 9/2015 | Tseng | ..................... | F41B 11/00 |
| 2007/0261542 A1* | 11/2007 | Chang | .................... | F41H 11/02 |
| | | | | 89/1.11 |
| 2015/0316345 A1* | 11/2015 | Brahler, II | .............. | F41B 11/72 |
| | | | | 124/73 |
| 2016/0023760 A1* | 1/2016 | Goodrich | ................ | B64C 11/48 |
| | | | | 244/10 |
| 2016/0376029 A1* | 12/2016 | Sekiya | ................... | F41H 11/02 |
| | | | | 244/110 F |
| 2017/0219317 A1* | 8/2017 | Sands | ................. | F41H 13/0006 |
| 2017/0253348 A1* | 9/2017 | Ashdown | .................. | B64F 1/02 |
| 2017/0261292 A1* | 9/2017 | Armstrong | ............. | F24B 12/56 |
| 2017/0356726 A1* | 12/2017 | Theiss | ................ | F41H 13/0006 |
| 2018/0094908 A1* | 4/2018 | Down | .................... | F41H 11/02 |

* cited by examiner

NETS AND DEVICES FOR FACILITATING CAPTURE OF UNMANNED AERIAL VEHICLES

PRIORITY CLAIM

The present Application for patent claims priority to Provisional Application No. 62/434,329 entitled "Nets and Devices for Facilitating Capture of Unmanned Aerial Vehicles" filed Dec. 14, 2016, the entire disclosure of which is hereby expressly incorporated by reference herein.

TECHNICAL FIELD

The technology discussed below relates generally to unmanned aerial vehicles (UAVs), and more specifically to methods and devices for facilitating the capture of unauthorized UAVs.

BACKGROUND

A recent area of concern is the increasing use of unmanned aerial vehicles (UAVs) by hostile adversaries. Common UAVs small enough to be portable (i.e. human-portable) are often referred to as drones. Such UAVs can be assembled from commercially off-the-shelf materials, or purchased in a ready-to-use state. A typical UAV can carry a relatively significant payload. Electric motors may provide UAVs with relative acoustic stealth. Commercially available miniature flight control computers and sensors provide such UAVs with some degree of autonomy, mitigating the need for line of sight operation or even a continuous link to a human pilot or offboard controller.

It is anticipated that inexpensive UAVs may be used by adversaries not only for intelligence, surveillance, and reconnaissance (ISR), but also as weapon delivery platforms that may carry explosive, chemical, radiological, and/or biological payloads. Attempting to destroy UAVs carrying such payloads makes possible inadvertent abetting of an adversary's mission. That is, conventional attempts to destroy a UAV may not neutralize the payload, but may actually assist in dispersing chemical or biological agents over an area. For example, shooting down a UAV could trigger dispersal of the chemical or biological agent onboard. Nets may be utilized to capture a UAV, but a net may also be unable to stop a protected propulsion system from maintaining thrust. Thus, systems that can inhibit the ability of a UAV propulsion system to continue operating are generally desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate capture UAVs and obstruction of UAV propulsion systems from continued operation. According to at least one aspect, UAV capture nets are provided. According to at least one embodiment, UAV capture nets may include an open-mesh material and a plurality of streamers coupled to the open-mesh material. Each of the plurality of streamers may include at least one free longitudinal end.

Additional aspects of the disclosure include netting systems. According to one or more embodiments, such netting systems may include a container with one or more barrels. A propellant may be disposed within at least one of the one or more barrels of the container. A net may be disposed within a barrel of the one or more barrels of the container to be launched on initiation of the propellant. The net may include an open-mesh structure and a plurality of streamers, where each streamer includes at least one free end extending away from the open-mesh structure.

Still further aspects of the disclosure include UAVs. One or more embodiments of a UAV may include an airframe and a propulsion system coupled to the airframe. A netting system may be coupled to the airframe, where the netting system includes a net with an open-mesh fabric and a plurality of streamers connected to a portion of the open-mesh fabric. Each streamer may include at least one longitudinal end that hangs free from the open-mesh fabric.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The illustrations presented herein are, in some instances, not actual views of any particular net, netting system, or UAV, but are merely idealized representations which are employed to describe the present disclosure. Additionally, elements common between figures may retain the same numerical designation.

Figure 1:
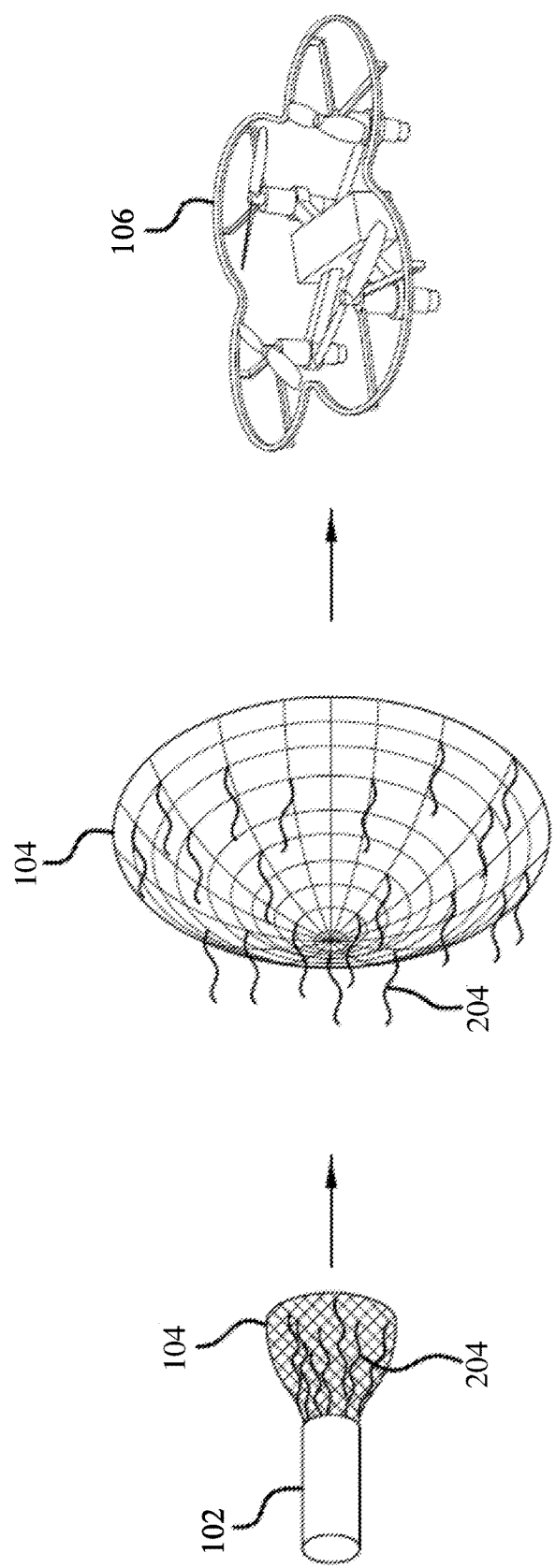
FIG. 1 is a diagram of a netting system in at least one example of an operational environment according to at least one embodiment.

Various embodiments of the present disclosure include netting systems capable of projecting a net at an unmanned aerial vehicle (UAV). Referring to FIG. 1, an example of a netting system is depicted in at least one example of an operational environment. The netting system can generally include a launching device 102 configured to launch a net 104. As depicted in FIG. 1, the launching device 102 may be employed to launch a net 104 toward a UAV 106. FIG. 1 illustrates how the net 104 may begin in a small compact shape and be opened wide as it is propelled toward the UAV 106.

The launching device 102 may be ground-based or airborne according to various embodiments. For example, the launching device 102 may be configured as a cannon or other similar configuration. In some embodiments, such a cannon configuration may be portable by a person. In some embodiments, such a cannon configuration may be fixed or mounted on an articulating turret on the ground or on a building. In some embodiments, such a cannon configuration may be coupled to a vehicle. A vehicle may include an airborne vehicle, such as a manned aircraft or a UAV, or a ground-based vehicle, such as an automobile.

The launching device 102 may include container housing the net 104 and a propellant. By way of example, the propellant may be compressed air, a gas generant, a spring, an electromagnet, or other suitable means. When the propellant is initiated, the force generated by the propellant can push the net 104 outward from the container toward a target, such as the UAV 106.

Although the container is depicted with a single barrel, various embodiments may include a plurality of barrels for different components associated with the net 104. For example, the container may be configured with a plurality of barrels, where one or more barrels includes the propellant and one or more projectiles coupled to the net 104, and one barrel may include the net 104. More specifically, at least one embodiment of the container includes four separate barrels with a propellant and a projectile, where each projectile is coupled to the net 104 at equally spaced locations around the perimeter of the net 104. The net 104 is disposed within a fifth barrel. The propellants in each of the four barrels can be initiated simultaneously, firing the four projectiles. The four projectiles then pull the net 104 out of its respective barrel in the direction fired.

In some instances, a UAV 106 may have a frame, mesh, cage or other structure positioned to protect its propellers from hitting objects or from getting items entangled in the spinning propellers. In such cases, a UAV 106 may be capable of maintaining sufficient lift to remain airborne and continue on its desired course while carrying the net 104, or even escaping from the net 104. According to an aspect of the present disclosure, nets 104 include streamers that increase the likelihood of entangling the propellers on a UAV 106 that may be captured within the net 104.

Figure 2:
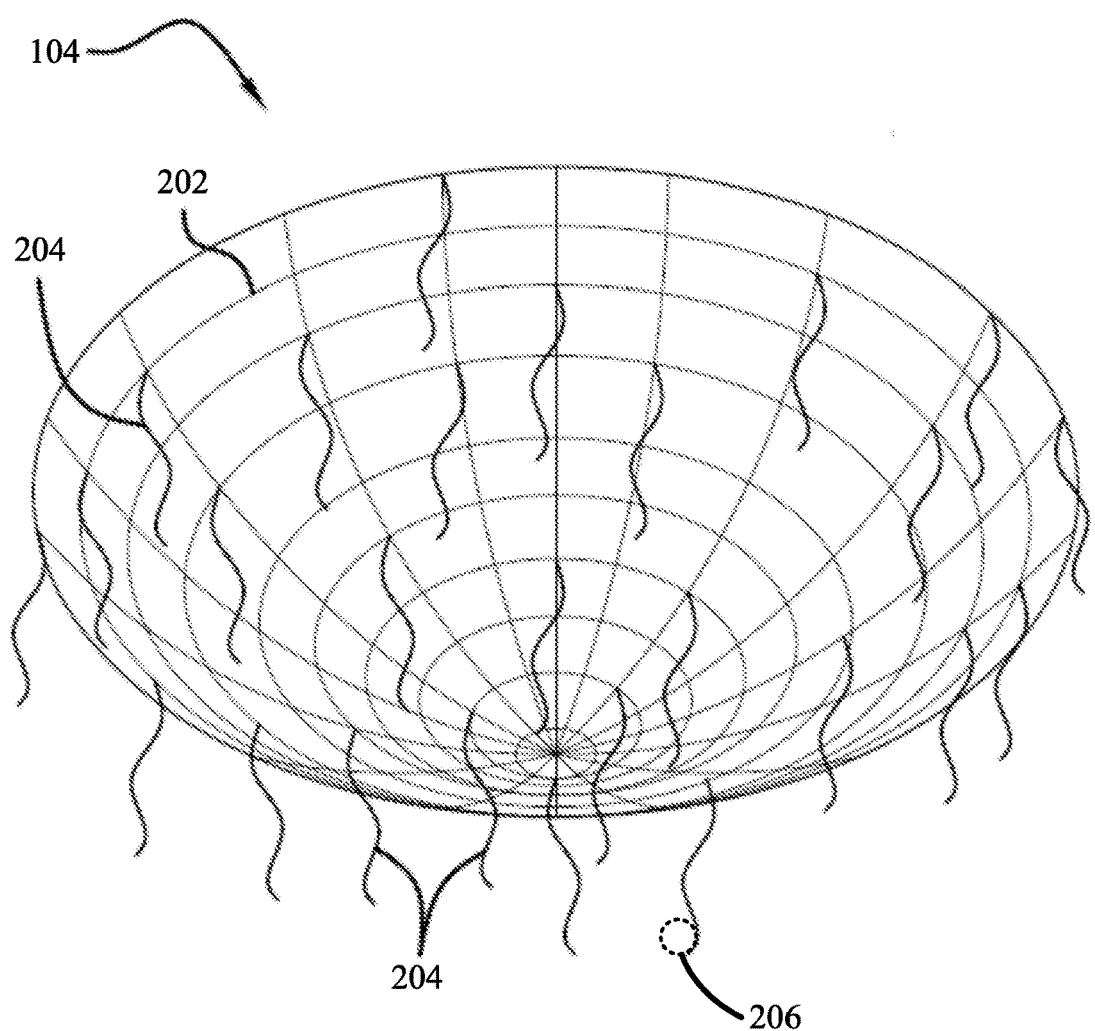
FIG. 2 is a schematic view of a net according to at least one embodiment of the present disclosure.
Figure 3:
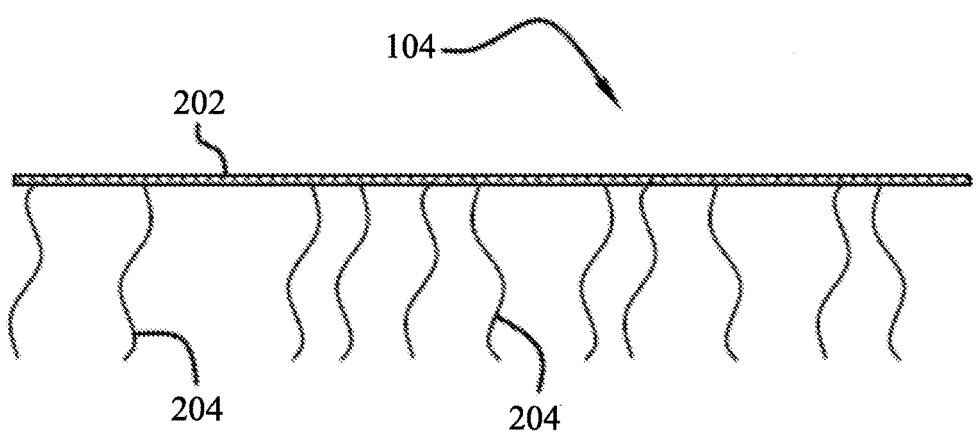
FIG. 3 is a side view of a net according to at least one embodiment of the present disclosure.

FIG. 2 is a schematic view of a net 104, and FIG. 3 is a side view of the net 104 according to an embodiment of the present disclosure. As illustrated, the net 104 includes an open-meshed fabric 202 formed of any suitable material twisted, knotted and/or woven together at substantially regular intervals forming a grid of any desirable shape. The size of the opening in the grid of the open-meshed fabric 202 may vary as desired. For example, in some embodiments, the open-meshed fabric 202 may have a relatively large number of cross-points, resulting in relatively small openings in the grid. In other embodiments, the open-meshed fabric 202 may have relatively few cross-points, resulting in relatively large openings in the grid.

Extending from the open-meshed fabric 202 are a plurality of streamers 204. The streamers 204 are connected to the open-meshed fabric 202 so that each streamer 204 has at least one free end. In at least one example, each streamer 204 may include a first longitudinal end that is coupled to the open-meshed fabric 202 and a second longitudinal end that is not coupled to anything. In other examples, each streamer 204 may include two longitudinal ends that are not coupled to anything, and a central section that is coupled to the open-meshed fabric 202. The free ends in either configuration can be utilized to entangle a propeller of a target UAV. For example, the free ends may be sucked into a propeller of a UAV to entangle the propeller. In embodiments with relatively large openings, as noted above, the open-meshed fabric 202 may be similar in appearance to unraveled twine with a plurality of streamers 204 connected to a small number of points.

In some embodiments, the open-meshed fabric 202 and the streamers 204 may be formed of the same material. For example, the open-meshed fabric 202 and the streamers 204 may be formed of a nylon material. In other embodiments, the streamers 204 may be formed of a different material than the open-meshed fabric 202. In each of the various embodiments, the particular material employed for the streamers 204 may be selected based on the material's strength. Specifically, the strength can be selected such that it is sufficiently strong to be capable of entangling a propeller without being broken.

Figure 4:
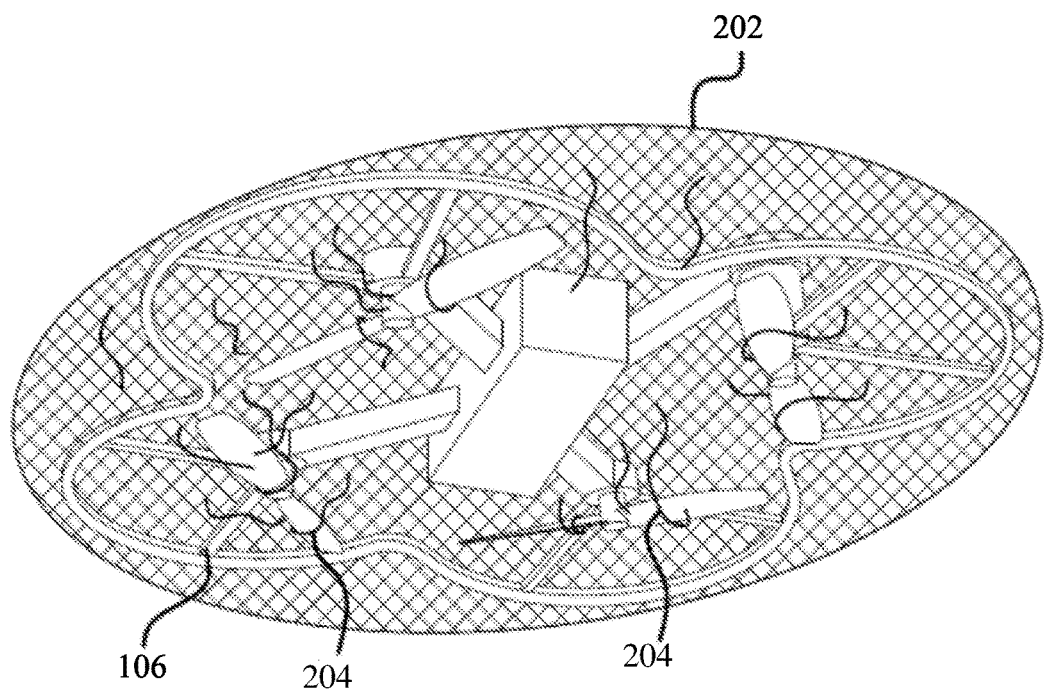
FIG. 4 is a view illustrating a UAV with a net over the UAV according to at least one embodiment of the present disclosure.

In use, the net 104 can be propelled at a UAV 106 to capture the UAV 106 within the net 104. For example, FIG. 4 shows a UAV 106 with a net 104 over the UAV 106. More specifically, the open-meshed fabric 202 is positioned over at least a portion of the UAV 106. As shown, the UAV 106 includes structure configured to protect the propellers from the open-meshed fabric 202. However, one or more streamers 204 can fall into or be pulled into one or more propellers. When the one or more streamers 204 are pulled into the one or more propellers, the streamers 204 can entangle the propellers, decreasing or inhibiting the ability of the UAV 106 to fly.

Figure 5:
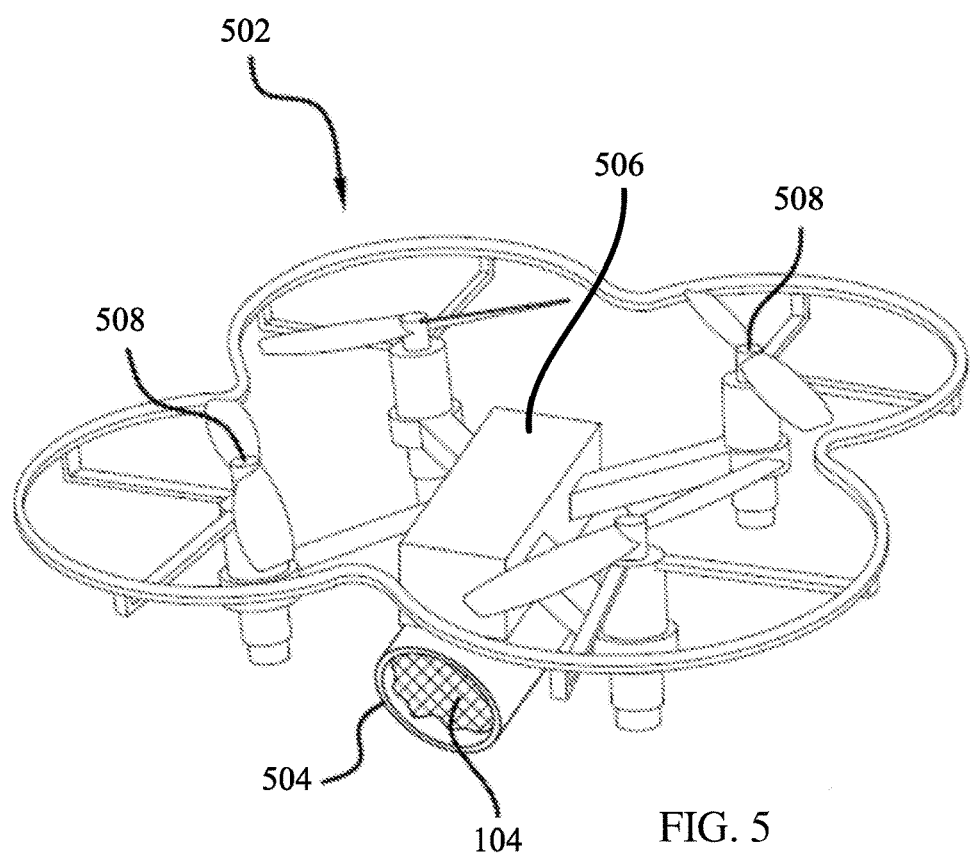
FIG. 5 is an example of a UAV carrying a deployable netting system according to at least one embodiment of the present disclosure.

Some aspects of the present disclosure include UAVs carrying a deployable netting system with a net including streamers as described above. FIG. 5 is an example of a UAV 502 carrying a deployable netting system 504 according to at least one embodiment. As shown, the UAV 502 includes an airframe 506 and a propulsion system coupled to the air frame 506. The propulsion system generally includes a plurality of propellers 508 coupled to motors. The propulsion system may be controlled to fly and steer the UAV 502 in a known manner Although four propellers 508 are depicted, the UAV 502 may include any number of propellers 508. The UAV 502 may generally include various electronics, such as GPS, radio, inertial measurement unit (IMU), and a flight controller to facilitate flight of the UAV 502 in cooperation with a user or autonomously.

Coupled to the airframe 506 is the netting system 504. As noted above, the netting system 504 may generally include a container with a propellant (e.g., gas generant, compressed air, spring, electromagnet), and a net disposed therein. The net is configured as the net 104 described above. For example, the net generally may include an open-mesh structure and a plurality of streamers connected to the open-meshed structure, as described herein.

Figure 6:
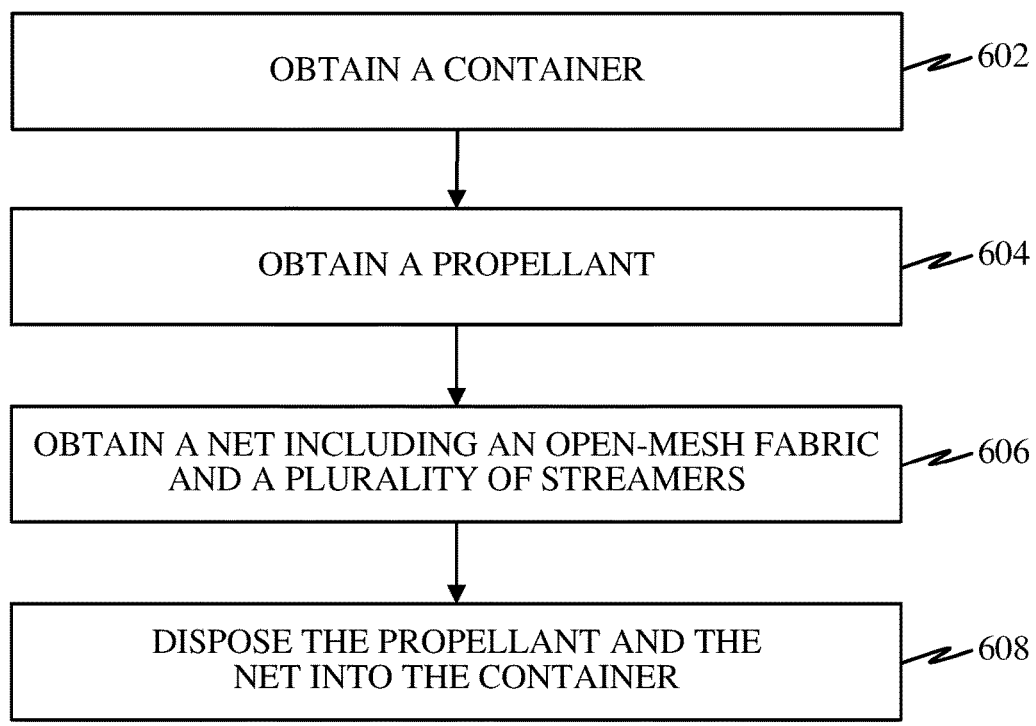
FIG. 6 is a flow diagram illustrating at least one example of a method of making a net according to at least one implementation of the present disclosure.

Additional aspects of the present disclosure include methods of making netting systems for capturing UAVs. FIG. 6 is a flow diagram illustrating at least one example of a method for making a netting system. At 602, a container is obtained. The container may simply be a cylindrical container, or other shapes with an end that is either opened or configured to be opened when the netting system is deployed. In some implementations, the container is configured as a cannon.

At 604, a propellant is obtained. As discussed herein, the propellant may include pressurized air or a gas generant.

At 606, a net may be obtained, where the net includes an open-mesh fabric coupled with a plurality of streamers. In at least one example, the net may be obtained by forming the net. Forming such a net my include forming an open-meshed fabric. The open-meshed fabric can be formed of any suitable material that is twisted, knotted and/or woven together at substantially regular intervals to form the open-mesh fabric.

A plurality of streamers can then be coupled to the open-mesh fabric. As described herein, the streamers can be coupled with at least one end free from the open-mesh fabric. In at least one implementation, one longitudinal end of each streamer may be coupled to the open-mesh fabric, with the opposite longitudinal end hanging free. In other implementations, a central portion of each streamer may be coupled to the open-mesh fabric, with each longitudinal end hanging free. The length and shape of each free end may be selected based on the intended use environment. The length of the streamers can be selected to facilitate the streamers to promote ingestion into the propulsion system of a target UAV. As a result, the shape may be selected to be sufficiently thin to pass through any prop guard system, while maintaining a thickness that will provide sufficient strength to seize a propulsion system without breaking the streamer. The width, thickness, and surface area of the streamers may be selected to optimize movement in the airflow of a target propulsion system and maximize the chance of ingestion and propulsion system fouling. In some embodiments, one or more streamers may include an ingestion feature 206 (see, e.g., element 206 shown in broken lines as an optional element in FIG. 2) configured to promote ingestion of the streamer into the propulsion system of the target UAV. For example, some embodiments may include streamers with an ingestion feature 206 configured as a relatively wide surface feature similar to a flag positioned at or near a free end of a streamer. In another example, an ingestion feature 206 may include a mass coupled to the free end of one or more of the streamers to cause that particular section of the streamer and net to have higher mass, while still maintaining similar drag as the remainder of the net, enabling the net to fall faster or more closely follow the ballistic profile from the launching system.

The streamer length may be selected to be sufficiently long to reach through a prop guard to the propulsion system with enough length to entangle the propulsion system, yet without too much length that the streamers inhibit launching and deployment of the net in the air or result in self-entanglement. In at least one embodiment, each streamer may have at least one free end between 4 inches and 18 inches in length.

At 608, the propellant and the net may be disposed into the container. The propellant is positioned relative to the net so that the propellant can push the net out of the container and toward a target when the propellant is initiated. As noted above, the container may be formed with a single barrel or may include a plurality of barrels.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

The various features associated with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An unmanned aerial vehicle (UAV) capture net, comprising:
   an open-mesh material; and
   a plurality of streamers coupled to the open-mesh material at a location inside of a perimeter of the open-mesh material, wherein each of the plurality of streamers includes at least one free longitudinal end, and wherein at least one streamer of the plurality of streamers includes an ingestion feature comprising a flag-shaped portion of the streamer with a wider surface relative to the rest of the streamer and positioned at the end of the at least one free longitudinal end.

2. The UAV capture net of claim 1, wherein the plurality of streamers include at least one free longitudinal end sized between 4 inches and 18 inches in length.

3. The UAV capture net of claim 1, wherein the open-mesh material and the plurality of streamers are formed from the same material.

4. The UAV capture net of claim 1, wherein the ingestion feature further comprises a mass coupled to the at least one streamer.

5. A netting system, comprising:
   a container including one or more barrels;
   a propellant disposed within at least one of the one or more barrels of the container; and
   a net disposed within a barrel of the one or more barrels of the container to be launched on initiation of the propellant, the net comprising an open-mesh structure and a plurality of streamers coupled to the open-mesh structure at a location within a perimeter of the open-mesh structure, each streamer including at least one free end extending away from the open-mesh structure, wherein at least one streamer of the plurality of streamers includes an ingestion feature comprising a flag-shaped portion of the streamer with a wider surface relative to the rest of the streamer and positioned at the end of the at least one free end.

6. The netting system of claim 5, wherein the plurality of streamers include at least one free end extending away from the open-mesh structure between 4 inches and 18 inches in length.

7. The netting system of claim 5, wherein the ingestion feature further comprises a mass coupled to the at least one streamer.

8. The netting system of claim 5, wherein the propellant comprises at least one of a compressed air, a gas generant, a spring, or an electromagnetic coil.

9. The netting system of claim 5, wherein the container is coupled to an airborne apparatus.

10. The netting system of claim 5, wherein the container is coupled to a ground-based launching system.

11. An unmanned aerial vehicle (UAV), comprising:
an airframe;
a propulsion system coupled to the airframe; and
a netting system coupled to the airframe, wherein the netting system includes a net including an open-mesh fabric and a plurality of streamers connected to a portion of the open-mesh fabric located interior to an outside edge of the open-mesh fabric, each streamer including at least one longitudinal end that hangs free from the open-mesh fabric, wherein at least one streamer of the plurality of streamers includes an ingestion feature comprising a flag-shaped portion of the streamer with a wider surface relative to the rest of the streamer and positioned at the end of the at least one longitudinal end that hangs free from the open-mesh fabric.

12. The UAV of claim 11, wherein the propulsion system comprises a plurality of propellers coupled to motors.

13. The UAV of claim 11, wherein the plurality of streamers include a free longitudinal end sized between 4 inches and 18 inches in length.

14. The UAV of claim 11, wherein the ingestion feature further comprises a mass coupled to the at least one streamer.

15. The UAV of claim 11, wherein the netting system further comprises:
a container including one or more barrels, at least one of the one or more barrels housing the net; and
a propellant disposed within at least one of the one or more barrels of the container.

16. The UAV of claim 15, wherein the propellant comprises one of a compressed air, a gas generant, a spring, or an electromagnetic coil.

17. A method of making a netting system, comprising:
obtaining a container including one or more barrels;
obtaining a propellant;
obtaining a net including an open-meshed fabric and a plurality of streamers connected to a portion of the open-mesh fabric, each streamer coupled to the open-mesh fabric at a location inside of an outside edge of the open-mesh material and including at least one first longitudinal end that hangs free from the open-mesh fabric, wherein at least one streamer of the plurality of streamers includes an ingestion feature comprising a flag-shaped portion of the streamer with a wider surface relative to the rest of the streamer and positioned at the end of the at least one first longitudinal end that hangs free from the open-mesh fabric; and
disposing the propellant and the net into the one or more barrels of the container to facilitate propulsion of the net out from the container in response to initiation of the propellant.

18. The method of claim 17, wherein obtaining the net comprises forming the net, wherein forming the net includes:
forming the open-meshed fabric; and
coupling the plurality of streamers to the open-meshed fabric.

19. The method of claim 18, wherein coupling the plurality of streamers to the open-meshed fabric comprises coupling a second longitudinal end to the open-mesh fabric.

20. The method of claim 18, wherein coupling the plurality of streamers to the open-meshed fabric comprises coupling a central section of each streamer to the open-meshed fabric.

* * * * *